(12) United States Patent
Arndt

(10) Patent No.: US 7,697,519 B2
(45) Date of Patent: Apr. 13, 2010

(54) PACKET PROCESSING

(75) Inventor: Manfred R. Arndt, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 11/590,714

(22) Filed: Oct. 31, 2006

(65) Prior Publication Data

US 2008/0101354 A1   May 1, 2008

(51) Int. Cl.
  H04L 12/28 (2006.01)
  H04L 12/56 (2006.01)
(52) U.S. Cl. .................................. 370/389; 370/395.32
(58) Field of Classification Search ................. 370/230, 370/235, 395.2, 395.3, 395.32, 395.4, 395.42, 370/412
See application file for complete search history.

(56) References Cited

U.S. PATENT DOCUMENTS

| | | | |
|---|---|---|---|
| 6,377,546 B1 | 4/2002 | Guerin et al. | |
| 6,515,963 B1 | 2/2003 | Bechtolsheim et al. | |
| 6,606,301 B1 * | 8/2003 | Muller et al. | 370/230 |
| 6,829,217 B1 | 12/2004 | Bechtolsheim et al. | |
| 6,985,442 B1 | 1/2006 | Wang et al. | |
| 7,092,357 B1 | 8/2006 | Ye | |
| 7,382,793 B1 * | 6/2008 | Sindhu et al. | 370/412 |
| 7,466,703 B1 * | 12/2008 | Arunachalam et al. | 370/392 |
| 2004/0114520 A1 | 6/2004 | Davis | |
| 2004/0143655 A1 | 7/2004 | Narad et al. | |
| 2006/0221835 A1 | 10/2006 | Sweeney | |

* cited by examiner

*Primary Examiner*—Chirag G Shah
*Assistant Examiner*—Minh-Trang Nguyen

(57) ABSTRACT

Embodiments of the present disclosure provide for packet processing in a network device. One method includes parsing incoming packets in a number of received flows to extract information from various packet fields. A number of bandwidth meters are used to track application bandwidth usage over a particular time interval in association with each flow. The meters are referenced with a hash algorithm and a drop probability for a particular packet is adjusted using the bandwidth meters and a number of factors.

17 Claims, 4 Drawing Sheets

300

| Ver | IHL | Type of Service | Total Length | | |
|---|---|---|---|---|---|
| Identification | | | Flag | Fragment Offset | |
| TTL | Protocol 330 | | Header Checksum | | |
| Source IP Address 320 | | | | | |
| Destination IP Address 340 | | | | | |
| 350 Source Port | | | Destination Port 360 | | |
| Sequence Number | | | | | |
| Acknowledgment Number | | | | | |
| Offset | Rsv | ECN | Cont. Bits | Window | |
| Checksum | | | Urgent Pointer | | |

310 points to the top of the IPv4 Header. IPv4 Header spans the first four rows; TCP Header spans the remaining rows.

*Fig. 3*

PACKET PROCESSING

BACKGROUND

Computing systems can include multiple computing devices such as servers, desktop PCs, laptops, and workstations, among other peripheral devices, (e.g., printers, facsimile devices, and scanners). In some systems, these network devices can be networked together across a local area network (LAN) and/or wide area network (WAN) to form a computing device network. A LAN and/or WAN uses clients and servers that have network-enabled operating systems such as Windows, Mac, Linux, and Unix.

Data communication between the different devices of the computing device network can include voice, video, still images, and data traffic. All have widely varying needs in terms of propagation delay (or latency) during transit through the network. Various systems and devices, both in hardware and in software, have attempted to deal with the large data flow requirements present in computing device networks.

One such scheme consists of attempting to allocate resources and police the traffic within the router or switch connecting multiple networks in the typical computing device network at either the data link or network function levels. Such schemes attempt to provide fair allocation of data throughput capacity (bandwidth) by allocating packet buffer and/or queue space according to the type of packets and arrival rate in each flow stream received.

A particular problem in network traffic policing arises from the variety of traffic sources or flows presented to the router/switching device. These flows each consist of multiple packets of data, in a variety of sizes and presented at a variety of rates. Additionally, flows may be presented using different networking protocols, such as the Transmission Control Protocol/Internet Protocol (TCP/IP) and the related User Datagram Protocol (UDP) over which application protocols, such as File Transfer Protocol (FTP), Terminal Emulation Protocol (Telnet), Session Initiation Protocol (SIP), Real Time Protocol (RTP), and Hypertext Transfer Protocol (HTTP) are layered on top of.

BRIEF DESCRIPTION OF THE DRAWINGS

FIG. 3 provides an example illustration of bit definitions for a TCP packet, including the fields within the TCP and IP headers.

DETAILED DESCRIPTION

Embodiments of the present disclosure provide for packet processing on a network device. One method embodiment includes parsing incoming packets in a number of received packet streams to extract information from various packet fields and associate them into unique flows. A number of bandwidth meters, e.g., hardware values, are used to track application bandwidth usage over a particular time interval in association with each flow. The bandwidth meters are referenced with a hash algorithm. Using the bandwidth meters, and a number of additional factors, a drop probability for a particular packet is adjusted. In various embodiments, the adjusted drop probability factor is compared to a random number. When the random number is less than the adjusted drop probability factor, the packet is dropped. When the random number is not less than the adjusted drop probability factor, the packet is placed in an appropriate queue.

The embodiments provide a resource friendly implementation to automatically rate limit high-bandwidth applications to avoid running out of packet buffers during congestion in a manner that is well suited for high performance hardware logic implementations within networking equipment, e.g., devices, with a limited number of hardware based priority queues and very high speed packet buffer memory used to support full line rate performance across all ports at gigabit and 10 GbE speeds. Embodiments can improve responsiveness for interactive applications, improve fairness between applications, and may provide reduced packet loss for low bandwidth applications like voice over IP (VoIP), without the involvement of complex and error-prone user interactions.

Although the terms router and/or switch will be used in this disclosure, those skilled in the art will realize that other related devices may be used, in addition to routers or switches, to perform analogous functions. Accordingly, the disclosure is not limited to any particular type of device, router, or switch. Also, although the disclosure discusses Internet Protocol (IP) packet flows, those skilled in the will art realize that protocols and flows other than IP, such as Ethernet, can be benefit from the present disclosure and its various embodiments. Accordingly, the disclosure is not limited to a particular type of protocol or packet format.

Figure 1:
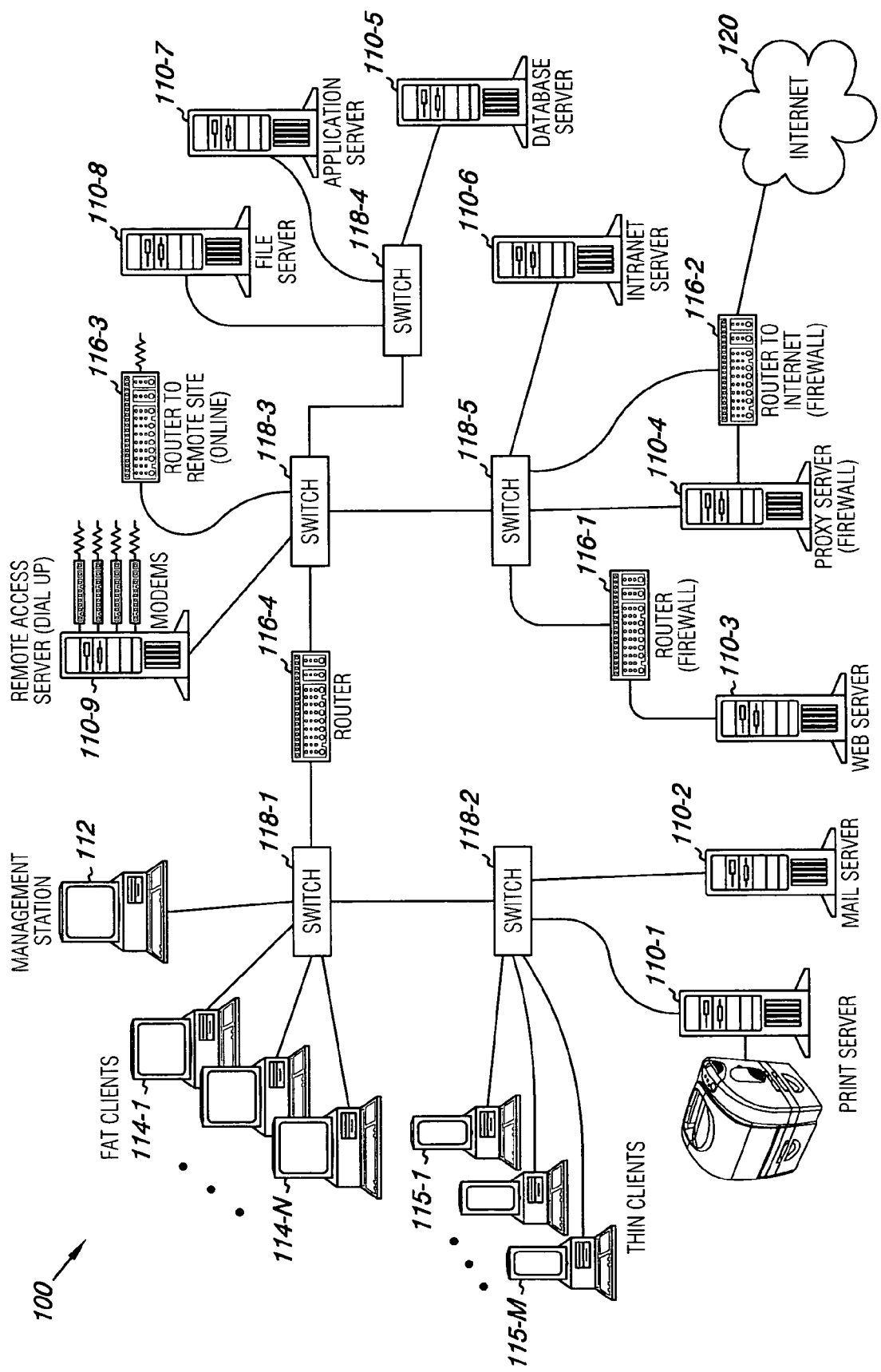
FIG. 1 is an embodiment of a computing device network.

FIG. 1 is an embodiment of a computing device network 100. As shown in FIG. 1, a number of devices, e.g., PCs, servers, peripherals, etc., can be networked together via a LAN and/or WAN via routers, hubs, switches, and the like (referred to herein as "network devices"). The embodiment of FIG. 1 illustrates clients and servers in a LAN. However, embodiments of the invention are not so limited.

The example network of FIG. 1 illustrates a print server 110-1 to handle print jobs for the network 100, a mail server 110-2, a web server 110-3, a proxy server (firewall) 110-4, a database server 110-5, and intranet server 110-6, an application server 110-7, a file server 110-8, and a remote access server (dial up) 110-9. Again, the examples provided here do not provide an exhaustive list. The embodiment of FIG. 1 further illustrates a network management station 112, e.g., a PC or workstation, a number of "fat" clients 114-1, ..., 114-N which can also include PCs and workstations and/or laptops, and a number of "thin" clients 115-1, ..., 115-M which can include terminals and/or peripherals such as scanners, facsimile devices, handheld multifunction device, VoIP phones, video conference, and/or IP video security devices, etc.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks via routers, 116-1, 116-2, 116-3, and 116-4, and hubs and/or switches 118-1, 118-2, 118-3, 118-4, and 118-5, as the same are known and understood by one of ordinary skill in the art. Embodiments of the disclosure, however, are not limited to the number and/or type of network devices in FIG. 1's illustration.

As one of ordinary skill in the art will appreciate, many of these devices include processor and memory hardware. By way of example and not by way of limitation, the network management station 112 will include a processor and memory as the same are well known to one of ordinary skill in the art. Similarly, the network devices of routers, 116-1, 116-2, 116-3, and 116-4, and hubs and/or switches 118-1, 118-2, 118-3, 118-4, and 118-5 may include processor and memory resources, along with hardware logic or application specific integrated circuits (ASICs). Embodiments of the invention are not limited, for the various devices in the network, to the number, type, or size of processor and memory resources.

Program instructions (e.g., computer executable instructions), as described in more detail below, can reside on the various network devices. For example, program instructions in the form of firmware, software, etc., can be resident on the network 100 in the memory of a network management station 112 and/or one or more routers, 116-1, 116-2, 116-3, and 116-4, and hubs and/or switches 118-1, 118-2, 118-3, 118-4, and 118-5, and be executable by the processor(s) thereon. As the reader will appreciate, program instructions can be resident in a number of locations on various network devices in the network 100 as employed in a distributed computing network.

As one of ordinary skill in the art will appreciate, each network device in the network is physically associated with a port of a switch to which it is connected. Data frames, or packets, are transferred between network devices by means of a switch's logic link control (LLC)/media access control (MAC) circuitry, or "engines", associated with each switch port. The network switch forwards data frames received from a transmitting network device to a destination network device based on the header information in the received data frame. The switch/router can also forward packets from a given network to other networks through one or more pre-configured ports.

Figure 2:
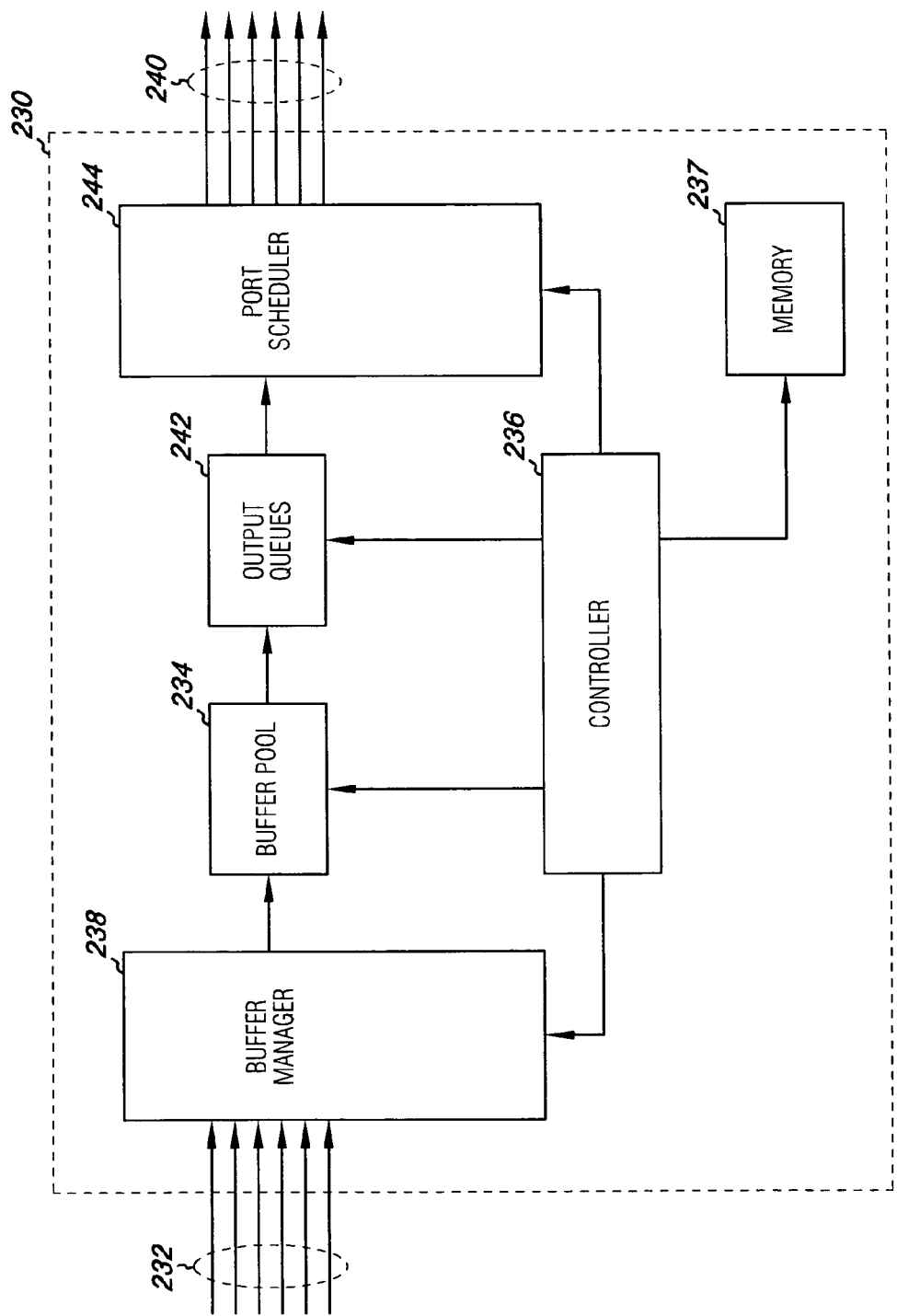
FIG. 2 illustrates an example network device including logic to perform functions according to embodiments of the present disclosure.

FIG. 2 illustrates an example embodiment of a network device 230 including logic to perform functions according to embodiments of the present disclosure. The network device 230 illustrated in FIG. 2 can include a switch, a router, etc., such as those illustrated in FIG. 1, which is responsible for processing packets, e.g., incoming and outgoing network packet traffic. As shown in FIG. 2, the network device 230 receives a number of input flows 232 to various ports on the network device. These flows each consist of multiple packets of data (containing packet headers as shown in FIG. 3), in a variety of sizes and presented at a variety of rates. Additionally, flows may be presented in different networking protocols, such as the TCP and the related UDP over which application protocols, such as FTP, Telnet, SIP, RTP, and HTTP are layered on top of. Many other internetworking protocols are also possible. As the reader will appreciate the ports receiving these flows can be on a network chip (e.g., application specific integrated circuit (ASICs)) and can include logic for the purpose of processing packets in each flow. The network chip may operate at the layer 2 and higher levels of TCP/IP protocol stack, e.g., logic link control/media access control-physical layers (MAC-PHY) and include logic circuitry associated therewith to achieve the embodiments described herein.

As the packets arrive they are buffered in a buffer pool 234, which may be very high speed memory with the network chips or external random access memory (RAM). Buffering is accomplished according to the directives of a controller 236, coupled to memory 237, and a buffer manager 238. The controller 236 and the buffer manager 238 can process packets, used in the network device's operation, which are received by network chips on the device 230.

The flows are sent to the proper output port 240 by way of a set of output queues 242 and a port scheduler 244, discussed herein. Controller 236, buffer manager 238, and port scheduler 244 can be implemented as one or more processors with associated interface circuitry and logic or can be implemented within a single ASIC to achieve the functions of the embodiments described herein.

Some flows through the network are well-behaved in the event of traffic congestion: when faced with packet drops (i.e., packets discarded deliberately by a networking device due to congestion control algorithm or due to insufficient resources at that device), these "good" (robust) flows reduce their flow rates and send less packets per unit of time, until they detect that the congestion goes away. Other flows, however, are not well-behaved. These non-adaptive "aggressive" flows (NAFs) do not throttle back the flow of packets to the network when they experience packet drops. This may be because the NAFs do not recognize the congestion, sometimes due to the protocol implementation, or sometimes because they actually are trying to capture more network bandwidth. The latter situation arises particularly in flows sent by sources that consider themselves higher priority than all others (hence the term "aggressive"); such priority assumptions by one flow are often in conflict in the modern, highly heterogeneous networks seen today.

Ethernet networks often do not run at a high average utilization, but do experience microburst of congestion. This may be compounded by link speed mismatches that can overwhelm limited buffer pools on switches and routers, e.g., device 230. When multiple applications share the same egress priority queue, a single non responsive or aggressive application may monopolize the buffer queue 242 and negatively impact all well-behaved applications sharing the same priority queue due to packet loss. Most modern applications can tolerate a limited amount of packet loss, but if packets are lost in burst, the impact may be significant. For TCP applications, this can result in slow TCP retransmission timeouts that have a big impact on aggregate throughput or in some cases can even result in the TCP connection to time out and the application fail. Avoiding intervals where a TCP connection does not get any link capacity for extended intervals, e.g., 100 milliseconds, can significantly improve performance. For interactive business applications, bursts of packet loss may result in slow application responsiveness and for voice over IP (VoIP) applications may result in poor voice quality.

When the aforementioned congestion situation occurs regularly, network operators often rely on manual interactions to identify the offending applications and configure the appropriate quality of service (QoS) policy and access control lists (ACLs). ACLs filter network traffic by controlling whether packets are forwarded or blocked at an interface or port. The network device examines each packet to determine whether to forward or drop the packet, based on the criteria specified within the access control lists. Access control list criteria could be the source address of the traffic, the destination address of the traffic, the upper-layer protocol, or other information. The disadvantage to doing this, however, is that it is time consuming, complex, and error prone. In addition, this approach is only viable for sophisticated users and may not be practical when the number and types of applications in use changes frequently.

Advanced QoS implementations on high end core routers and load balancing network devices address the above issues by using a large number of individual per-flow buffer queues to insure fairness between applications and prevent a handful of applications from consuming all the resources. This approach works, but is very resource intensive and challenging to be implemented in ASIC based hardware.

Previous policing schemes include both queue-based and buffer-based approaches. QoS policy and ACLs are an example of a queue-based scheme in which incoming flows are classified according to their actual priority, as determined by the receiving network device, and assigned accordingly to output queues within the network device. High priority flows, such as time-sensitive voice traffic, are placed in a queue that is service much more often. Low priority flows, such as file transfer protocol (FTP) or hypertext transfer protocol (HTTP) flows, are placed in queues that are serviced at a slower rate. Per-flow queuing is an example of a queue-based scheme which assigns one queue per input flow and typically limits the number of buffers that any flow can consume at a given time. Queues are service according to statistically fair scheduling process, such as round-robin scheduling. In round-robin scheduling, one packet is serviced out of each queue, one queue at a time, servicing again from the first queue only when one packet has been serviced from every other queue with packets buffered. Per-flow queuing operates well and insures fairness between applications when the number and variety of input flows is small, but becomes inefficient as the number of flows grows. A high number of flows require a large number of queues, consuming a proportionally larger amount of resources, both in hardware and in operational complexity. More memory and more processing overhead is required to set up and tear down the associated resources when flows begin and end. In the context of the modern networks seen today, this extra cost and complexity is undesirably inefficient.

A number of network switches and routers try to improve application fairness by using congestion avoidance algorithms, like RED (Random Early Detection) and WRED (Weighted Random Early Detection). By dropping some packets early rather than waiting until the buffer is full, RED tries to get the TCP applications to slow down their transmit rate, since TCP will reduce the advertised window size in response to packet loss and their associated retransmissions. RED and WRED can improve fairness, but are only useful with well behaved applications and provides no benefit for non-responsive applications like streaming video. That is, many certain NAFs do not reduce their packet rate and thus continue to take a disproportionate amount of network bandwidth, simply because they do not respond to packet drops. The "good" flows get less and less throughput as they reduce their transmit rate in response to drops while the NAFs capture more bandwidth. In addition, careful tuning of several RED or WRED parameters is needed based on the number and type of applications sharing a link, otherwise overall aggregate performance can actually be worse.

As a further drawback, the random packet drops sometimes hit a fragile flow. These flows contain time-critical or loss sensitive traffic, such as voice data. Fragile flows have the lowest tolerance for drops and delay, so even a low number of packet drops from a random packet drop management scheme can have a highly undesirable effect on them.

To overcome the issues described above, embodiments of the present disclosure provide additional logic to the buffer manager 238 and port scheduler 244 of the network device 230. This logic executes to process packets using a number of bandwidth meters to adjust a drop probability based on a combination of several factors. As will be described in more detail in connection with FIG. 4, these factors include: remaining available buffer pool; an evaluation of low bandwidth flows; and evaluation of recent bandwidth usage; packet queue size; and queue priority. In various embodiments, once the drop probability has been computed, the logic compares the adjusted drop probability factor to a random number. According to various embodiments, the logic will drop a packet if the random number is less than the adjusted drop probability; otherwise the packet is placed in an appropriate queue.

According to various embodiments, the number of bandwidth meters can be a dedicated per port resource or shared across multiple ports. Each bandwidth meter tracks application bandwidth usage over a particular time interval in association with each flow, e.g., count packets or bytes over a time interval in association with a particular application or group of applications. Hence, a given bandwidth meter can be shared across multiple applications identified as a particular flow, based on a hash algorithm applied to information extracted from header fields parsed from incoming packets. The values associated with each of the bandwidth meters can be stored in a table of bandwidth meters. The bandwidth meters are referenced using the flow id from the hash algorithm.

FIG. 3 provides an illustration of a bit definitions for a TCP packet, including the fields within its TCP and IP headers 300. As shown in FIG. 3, the flow id or flow classification can be calculated using a hash algorithm applied to information extracted from fields parsed from the header 300 of incoming packets, for instance, including the precedence or type of service (TOS) field 310, a source IP address field 320, a destination IP address field 340, a protocol field 330, a source port field 350, a destination port field 360, etc, or any combination thereof. As mentioned above, the bandwidth meters are referenced using the flow id calculated using a hash algorithm applied to information extracted from fields parsed from the header 300 of incoming packets.

In one example embodiment, an n-tuple hash algorithm, as the same will be recognized by one of skill in the art, is used to reference the bandwidth meters. For example, an n-tuple hash algorithm may reference a particular bandwidth meter from a table of bandwidth meters by computing a hash index value based on a combination of information extracted from the source IP address field 320, the destination IP address field 340, the application source port field 350, and the destination port field 360. Embodiments are not limited to this particular example and other combinations may also be used. Thus, as the reader will appreciate, multiple applications may share a hash index value, e.g., hash to the same value. However, by using a sufficiently large number of bandwidth meters, a reasonable distribution of hash index values will be achieved.

Figure 4:
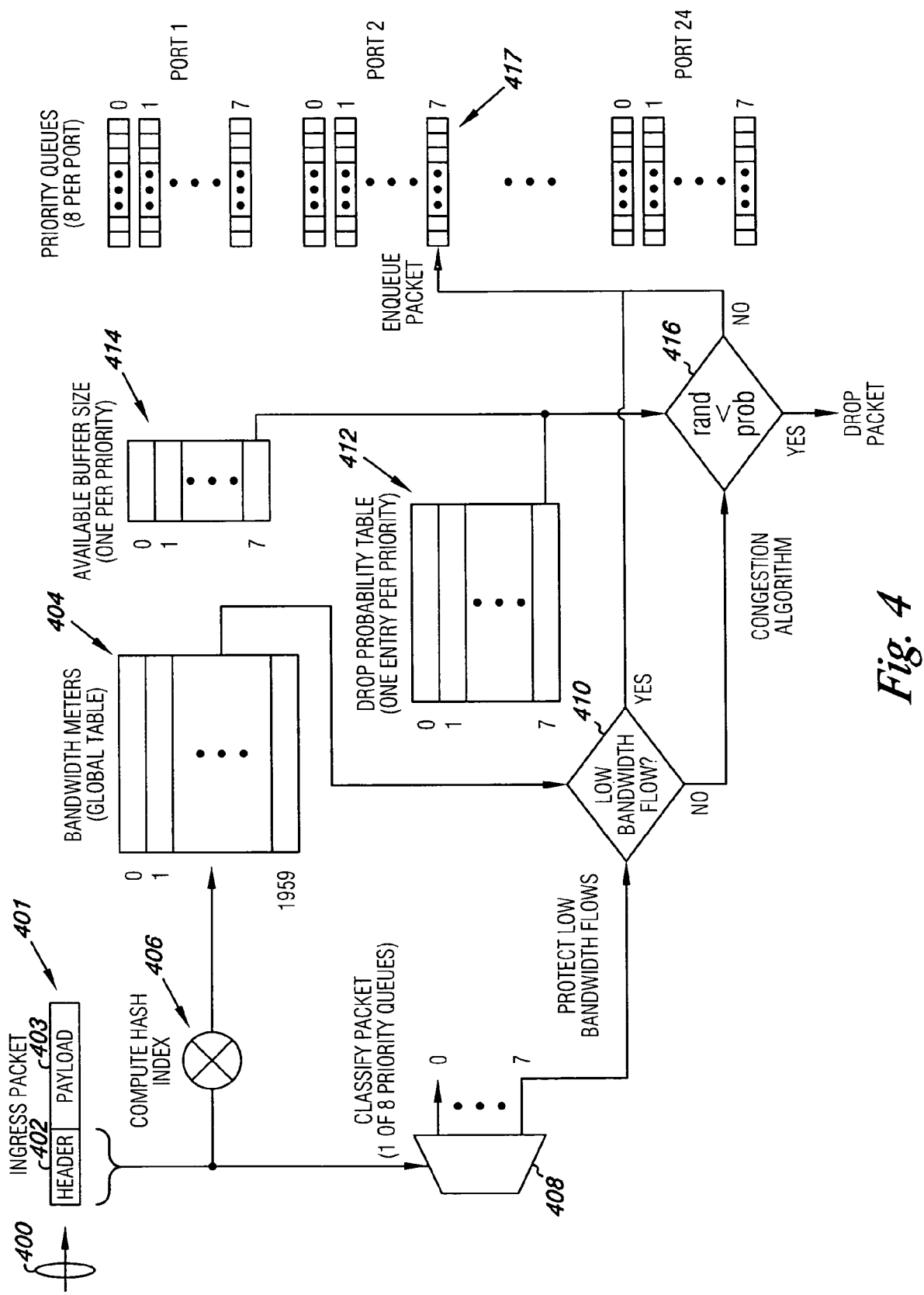
FIG. 4 illustrates an operational diagram implementing various logic embodiments according to the present disclosure.

FIG. 4 illustrates an operational diagram implementing various logic embodiments according to the present disclosure. As described in connection with FIG. 2, a number of packet streams, e.g., 400, are received to various ports on a network device. These packet streams each consist of multiple packets, e.g., packet 401 having header information 403 and payload data 405, in a variety of sizes and presented at a variety of rates. As noted above, packet streams may be presented in different protocols, such as the TCP and the related UDP, FTP, Telnet, SIP, RTP, and HTTP, etc. As the reader will appreciate the ports receiving these packet streams can be on a network chip (ASIC) and can include logic associated with the network device for the purpose of processing packets into a set of flows. As the packets arrive they are buffered in a buffer pool. As described in connection with FIG. 2, buffering is accomplished according to the directives of a controller coupled to memory and a buffer manager.

The controller and the buffer manager can process packets, used in the network device's operation, which are received to the device. As described above, a number of bandwidth meters are associated with the received flows. In various embodiments, additional logic is provided to the buffer manager which can allocate the bandwidth meters in a dedicated fashion, e.g., as a per port resource, or as a shared resource across multiple ports.

According to embodiments, these bandwidth meters track, e.g., count, application bandwidth usage over a particular time interval in association with each flow 400, e.g., count packets or bytes in association with a particular application or group of applications. Hence, a given bandwidth meter can be shared across multiple applications within a particular flow. Logic can increment a particular bandwidth meter as a packet 401 associated with the meter is added to a particular queue and logic can decrement the bandwidth meter based on the time interval since the last meter update. The total time over which to track bandwidth usage should be fairly short, e.g., on the order of 100 milliseconds or so. Embodiments, however, are not limited to the total time over which to track bandwidth usage given in this example.

The values associated with each of the number of bandwidth meters can be stored and referenced in a table of bandwidth meters 404. The example embodiment of FIG. 4 is discussed in reference to a device (or ASIC) having twenty four (24) ports with eight (8) output queues (shown as queues 0-7) assigned per port (shown as ports 1-24). As one example embodiment, bandwidth meters can be allocated to the flows received to a particular device (or ASIC). This example could accommodate 10 bandwidth meters per queue if allocated as a per port resource. Similarly more or fewer bandwidth meters can be associated with the flows of a particular queue if allocated as a shared resource across multiple queues or ports. Embodiments, however, are not limited to the number of queues, ports, or bandwidth meters given in this example.

As shown in FIG. 4, upon receipt of an incoming packet, e.g., 401, in a given flow, 400, the packet header 402 is parsed. As described in FIG. 3, the packet header 402 can be parsed to extract information from various fields in the packet header 402, e.g., to determine and extract the protocol, source IP address, destination IP address, source port, and destination port, etc. One of ordinary skill in the art will recognize that the above described parsing and extraction may be accomplished by either hardware or software or a combination thereof, such as a lookup table. Accordingly, embodiments of the present disclosure are not limited to any particular parsing scheme.

As shown at 406, the parsed information is used by a hash algorithm to reference the bandwidth meter values as stored in the table of bandwidth meters 404. As one example embodiment, an n-tupple hash algorithm is used to compute a hash index value from the parsed packet header information to generate a hash index value to reference the table of bandwidth meters 404. The flow identifying information contained in the packet header data is hashed in order to reduce the range of packet header values into a single compact, easily manipulated field having a far smaller range of values. Various methods can be used to combine the range of packet header values and create the hash index value. Examples include, but are not limited to, applying exclusive OR (XOR) logic and sixteen bit cyclical redundancy checking (CRC16) logic.

One of ordinary skill in the art will appreciate that such hashing may be accomplished with hardware or software means or a combination thereof. Additionally, although an IP packet, e.g., 401, is described in connection with FIG. 4, the reader will appreciate that datagrams or packets other than IP packets can be used with the embodiments of the present disclosure. Other datagram formats can be accommodated by determining the type of datagram received by known methods, such as reading identifying data from the header, and applying the hash function to the appropriate data fields, etc. Accordingly, the disclosure is not limited to any particular type of packet.

In the n-tupple hash algorithm example above, a particular bandwidth meter from the table of bandwidth meters 404 is referenced by computing a hash index value (flow id) based on a combination of information extracted from the source IP address field, the destination IP address field, the application source port field, and the destination port field. Embodiments are not limited to this particular example and other combinations may also be used. Multiple applications in one or more packet streams may hash to the same flow id value. However, by using a sufficiently large number of bandwidth meters, e.g., 1920 in this example, a reasonable distribution of hash index values will be achieved.

As shown at 408, logic operates on the parsed information to classify a packet, e.g., 401, as belonging to a particular QoS priority, based on predefined QoS policies. In the example embodiment of FIG. 4, eight (8) queues (shown as queues 0-7, respectively), identified as priority queues have been assigned to each of the ports, e.g., ports 1-24. Hence, in this example embodiment the logic operates on the parsed information to classify the packet 401 in association with one of the eight priority queues.

As describe above, logic is provided to process packets using the values associated with the number of bandwidth meters to adjust a drop probability based on a combination of a number of factors. In the example embodiment shown in FIG. 4, these factors include: remaining available buffer pool; an evaluation of low bandwidth flows; an evaluation of recent bandwidth usage; packet queue size; and priority. According to various embodiments, an adjusted drop probability factor is compared to a random number. In these embodiments, the logic operates to discard a particular packet, when the random number is less than the adjusted drop probability; otherwise buffer and place the packet on the appropriate queue based on existing quality of service (QoS) policies, when the random number is not less than the adjusted drop probability factor.

In the example embodiment of FIG. 4, logic operates at 410 to protect low bandwidth flows. That is, as shown in FIG. 4, embodiments use logic to compare values associated with one or more applications associated with a flow id, e.g., as retrieved from the bandwidth meter table 404, to determine whether a given flow is a low bandwidth flow. As shown at 410, if the flow is a low bandwidth flow then the logic operates to adjust the drop probability associated with packets in that flow such that the packet is more likely to be enqueued. As the reader will appreciate, the logic can further adjust the drop probability as a function of room available in a particular queue. In various embodiments, global drop probability table 412 may be provided with one table entry per priority queue (8) on the device, or a separate drop probability table may be provided for every port with 8 table entries each one for each queue associated with a particular port.

Hence according to embodiments, logic can operate such that when a low bandwidth flow is detected a drop probability for packets in that flow is reduced. A single or multiple thresholds can be used. In various embodiments, reducing the drop probability will lessen the likelihood of a random number comparison producing a random number which is less than the drop probability and hence packets associated with the particular flow will be more likely to be buffered and placed on an appropriate queue based on other existing quality of service (QoS) policies. Hence, low bandwidth flows, e.g., containing applications like VoIP, will be protected and experience less packet loss. According to certain example embodiments, such as shown in FIG. 4, the drop probability is reduced for flows with low recent bandwidth usage such that packets associated with the flow are directly enqueued on an appropriate queue, irrespective of the value of the random number.

As shown in the example embodiment of FIG. 4, if logic determines that a particular flow is not a low bandwidth flow, then logic operates using the bandwidth meter value associated to the flow id to adjust a drop probability, e.g., entries in the drop probability table 412 based on a combination of an additional number of factors as described above. One factor includes the available buffer pool size 414 (on a per priority basis if buffer memory is dynamically shared across all ports, e.g., 8 per chip/device). As shown in the embodiment of FIG. 4, available buffer pool size can be maintained in a table 414 with one table per device (or ASIC) and with one entry for each priority queue, e.g., eight (8) entries or one entry in each table for each queue assigned to a particular port, e.g., entries 0-7. Another factor includes the packet queue size, shown at 417. That is, the priority queues include their queue size. Hence according to embodiments, logic can operate such that when a destination priority queue size is below an established, e.g., predetermined, queue size threshold a drop probability for packets in that flow is reduced. A single or multiple thresholds can be used. Again, reducing the drop probability will lessen the likelihood of a random number comparison producing a random number which is less than the drop probability and hence packets associated with a particular destination queue having a destination priority queue size below that threshold will be more likely to be buffered and placed on the destination queue.

In various embodiments the logic can operate so as to never drop a packet when a destination priority queue size is below an established, e.g., predetermined, queue size threshold. Hence, embodiments will operate to prevent the starvation of ports with few packets queued, even though the available buffer pool may be low due to other ports and flows consuming lots of packet buffers.

As mentioned above, additional factors combined by logic to adjust a drop probability logic using the values associated with the number of bandwidth meters include the factor of remaining available buffer pool. Here logic will operate such that as the available buffer pool (e.g., as shared across multiple ports) decreases, the drop probability factor increases. Again, a given bandwidth meter can be used to increment a value as packets or bytes associated with one or more applications identified as a particular flow enter the buffer pool and to decrement based on the time interval since the last meter update. Increasing the drop probability will increase the likelihood of a random number comparison producing value which is less than the drop probability and hence packets associated with flows having high bandwidth usage, e.g., according to a particular threshold or multiple thresholds, will be more likely to be discarded.

In various embodiments the logic can operate so as to never drop a packet when the remaining available buffer pool size is above a particular threshold. Hence, in a shared memory buffer allocation scheme across multiple ports, the logic will operate to support deep queue sizes when only a few ports are busy and prevent global buffer exhaustion when many queues are congested. Additionally, in a share memory buffer allocation scheme across multiple ports, the logic will operate to fairly distribute buffers across multiple ports, e.g., ports with many simultaneous applications will get more buffers than ports with only a few applications and/or users.

According to embodiments, another of the additional factors combined by logic to adjust a drop probability logic using the bandwidth meter value associated to the flow id includes the factor of recent bandwidth usage. Here logic will operate to increase the drop probability for flows with high recent bandwidth usages. Again, a single or multiple thresholds can be used. As described herein, each bandwidth meter tracks the bandwidth usage over a particular time interval associated with one or more applications for each flow, incrementing and decrementing the bandwidth meter value based on the bandwidth usage over a particular period of time. Increasing the drop probability for packets associated with one or more applications for a given flow will increase the likelihood of a random number comparison producing a random number which is less than the drop probability and hence packets associated with one or more applications for a given flow with a bandwidth meter reflecting high recent bandwidth usage, will be more likely to be discarded.

Additionally, according to embodiments, another of the additional factors combined by logic to adjust a drop probability logic using the values associated with the number of bandwidth meters includes the factor of administrator configuration. Here logic can operate such that the various queue size thresholds, bandwidth thresholds, and drop probability factors described herein can be established, e.g., configured on a per-priority queue basis. That is, in the example embodiment of FIG. 4, the various queue size thresholds, bandwidth thresholds, and drop probability factors can be configured on a per-priority queue basis, such that there would be eight (8) sets of configurations shared across all ports (1-24). Alternatively, the various queue size thresholds, bandwidth thresholds, and drop probability factors could be configured on a per-port priority queue basis as well.

As shown in FIG. 4, once an adjusted drop probability has been calculated (e.g., using entries in table 412, the bandwidth meters and a number of factors, as describe above), the logic compares the adjusted drop probability factor to a random number as shown at 416. As described in the embodiments, the logic executes to drop, e.g., discard, a packet if the random number is less than the adjusted drop probability factor. Otherwise, as illustrated in the example embodiment of FIG. 4, the packet is placed in the appropriate priority queue, based on the predefined QoS policy and destination port, as one of ordinary skill in the art will recognize and understand the same.

As described herein, logic can execute to allocate multiple bandwidth meters per queue, shared across multiple queues or shared across multiple ports. These meters track bandwidth usage for packets associated with one or more applications over a fairly short interval, e.g., on the order of 100 ms or so. The meters are referenced using the flow id where multiple applications may hash to the same value. According to embodiments, logic can operate to share bandwidth meters referenced in the table of bandwidth meters across one or more queues or across multiple ports. Sharing the meters allows flexibility for a wide variety of constantly changing flow types. Alternatively, a predetermined number of meters can be assigned from the fixed size table of bandwidth meters to each port. For each queue there can be a global table of drop probabilities.

The reader will appreciate that embodiments of the present disclosure can provide many of the benefits for a per-flow queuing implementation, but with a significantly better cost versus performance trade-off and also a much more scalable implementation. For example, benefits over current 802.1D based priority queuing (e.g., up to 8 queues per port) include: better aggregate TCP performance by avoiding slow start retransmissions; avoiding applications failures from excessive TCP retransmission timeouts; automatically rate limiting bandwidth hogs fairly during congestion; automatically protecting low bandwidth flows even without QoS enabled (e.g., insures excellent voice quality and responsive interactive applications); providing consistent TCP performance, even with many connections (e.g., faster DNS lookup, 3 way TCP handshake, slow start/congestion recovery); preventing a small number of non-responsive applications from consuming the majority of the bandwidth; and eliminating the need to manually configure responsive and unresponsive traffic to be classified into separate priority queues or blocked by ACL filters.

An additional benefit of the various embodiments when used with a shared memory buffer allocation scheme across multiple ports includes: supporting deep queue sizes when only a few ports are busy, but preventing global buffer starvation when many queues are congested; and fairly distributing buffers across multiple ports (e.g., ports with many simultaneous applications getting more buffers than ports with only a few applications.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for packet processing on a network device, comprising:
   parsing incoming packets by a processor to extract information from various packet fields and associate the packets into a number of flows;
   using a number of bandwidth meters to track application bandwidth usage over a particular time interval in association with the number of received flows;
   referencing the number of bandwidth meters with a hash algorithm;
   using the bandwidth meters and a number of factors to adjust a drop probability for a particular packet; and
   comparing an adjusted drop probability factor to a random number, wherein comparing includes:
   discarding the particular packet, when the random number is less than the adjusted drop probability factor; and
   buffering and placing the packet in an appropriate queue based on existing quality of service (QoS) policies, when the random number is not less than the adjusted drop probability factor.

2. The method of claim 1, using the bandwidth meters and the number of factors to adjust a drop probability for the particular packet includes using a number of factors selected from the group of:
   a remaining available buffer pool;
   a protection of low bandwidth flows;
   a recent bandwidth usage;
   a packet queue size; and
   an administrator configuration.

3. The method of claim 2, wherein the method includes increasing the drop probability factor when the remaining available buffer pool decreases.

4. The method of claim 2, wherein the method includes reducing the drop probability factor for low bandwidth flows as compared to high bandwidth flows.

5. The method of claim 2, wherein the method includes increasing the drop probability factor when the number of bandwidth meters for packets associated with one or more applications in one or more flows reflect high recent bandwidth usage.

6. The method of claim 2, wherein the method includes reducing the drop probability of a particular packet when a destination priority queue size is below an established queue size threshold.

7. The method of claim 1, wherein the method includes storing the number of bandwidth meters in a table of bandwidth meters.

8. The method of claim 7, wherein the method includes sharing the number of bandwidth meters across a number of ports.

9. The method of claim 7, wherein the method includes assigning a particular number of meters from a fixed sized table of bandwidth meters to a particular port and a particular queue.

10. The method of claim 7, wherein the method includes using the number of bandwidth meters to track application bandwidth usage over a time interval of less than 100 milliseconds.

11. The method of claim 10, wherein the method includes:
    incrementing a bandwidth meter as a packet associated with the meter is added to a particular queue; and
    decrementing the bandwidth meter based on the time interval since a last update of the bandwidth meter.

12. A network device, comprising:
    a processor; and
    a network chip coupled to the processor, the network chip including logic circuitry to:
    parse incoming packets to extract information from various packet fields and associate the packets into a number of flows;
    use a number of bandwidth meters to track application bandwidth usage over a particular time interval in association with the number of flows;
    reference the number of bandwidth meters with a hash algorithm;
    use the bandwidth meters and a number of factors determine whether to discard a packet and whether to place the packet in a queue, wherein the number of factors are selected from the group of:
    a remaining available buffer pool;
    a protection of low bandwidth flows;
    a recent bandwidth usage;
    a packet queue size; and
    an administrator configuration;
    allocate the number of bandwidth meters to provide:

multiple bandwidth meters per queue, wherein the number of bandwidth meters can be shared among multiple queues and multiple ports; and multiple applications per bandwidth meter;

use the bandwidth meters and the number of factors to adjust a drop probability for a particular packet; and compare the adjusted drop probability factor to a random number, wherein comparing includes:

discarding the packet when the random number is less than the adjusted drop probability factor; and buffering and placing the packet in an appropriate queue based on existing quality of service (QoS) policies when the random number is not less than the adjusted drop probability factor.

13. The network device of claim 12, wherein the network chip includes logic to use the number of bandwidth meters to track application bandwidth usage over a time interval of less than 100 milliseconds.

14. The network device of claim 12, wherein the network chip includes logic to never drop a packet when a remaining available buffer pool size is above a particular threshold.

15. The network device of claim 12, wherein the network chip includes logic to set a drop probability of a particular packet to zero in association with a low bandwidth flow below an established threshold.

16. The network device of claim 12, wherein the network chip includes logic to reduce a drop probability for low bandwidth flows as compared to high bandwidth flows.

17. The network device of claim 12, wherein the network chip includes logic to increase a drop probability when the number of bandwidth meters for packets associated with one or more applications in one or more flows reflect a high recent bandwidth usage.

* * * * *